United States Patent [19]
Lombardi et al.

[11] Patent Number: 5,178,428
[45] Date of Patent: Jan. 12, 1993

[54] ARMATURE GRIPPING MACHINE

[75] Inventors: Massimo Lombardi; Gianluigi Pisani, both of Florence, Italy

[73] Assignee: Axis USA, Inc., Marlborough, Mass.

[21] Appl. No.: 829,585

[22] Filed: Feb. 3, 1992

Related U.S. Application Data

[63] Continuation of Ser. No. 539,989, Jun. 18, 1990, abandoned.

[51] Int. Cl.[5] .......................... B66C 1/42; B23B 31/00
[52] U.S. Cl. ..................................... 294/88; 294/100; 279/51
[58] Field of Search ................. 294/94, 100, 82.28, 294/86.15, 86.12, 88; 279/50, 51, 110

[56] References Cited

U.S. PATENT DOCUMENTS

| | | | |
|---|---|---|---|
| 1,823,340 | 9/1931 | Vance | 294/86.15 |
| 3,533,636 | 10/1970 | Firestone et al. | 279/50 X |
| 3,623,194 | 11/1971 | Claeson et al. | 24/635 |
| 3,776,397 | 12/1973 | Hoy et al. | 214/8.5 K |
| 4,006,862 | 2/1977 | Shively et al. | 242/7.05 B |
| 4,087,054 | 5/1978 | Finegold | 242/7.05 B |
| 4,128,043 | 12/1978 | Grassl | 279/51 |
| 4,257,639 | 3/1981 | Stock | 294/88 X |
| 4,502,824 | 3/1985 | Dohse et al. | 409/234 |
| 4,596,272 | 6/1986 | Medvick et al. | 137/614.03 |
| 4,643,472 | 2/1987 | Schukei et al. | 294/94 |
| 4,671,540 | 6/1987 | Medvick et al. | 285/87 |
| 4,708,297 | 11/1987 | Boers | 242/7.05 B |
| 4,762,447 | 8/1988 | Marantette | 279/50 |
| 4,786,004 | 11/1988 | Boers | 242/705 B |
| 4,876,429 | 10/1989 | Buchler | 219/69.15 |
| 4,915,313 | 4/1990 | Banner et al. | 242/7.05 B |
| 4,943,071 | 7/1990 | Srebot et al. | 279/116 X |
| 4,989,818 | 2/1991 | Trundle et al. | 294/94 |

FOREIGN PATENT DOCUMENTS

| | | |
|---|---|---|
| 217664 | 10/1986 | European Pat. Off. . |
| 318307 | 11/1988 | European Pat. Off. . |
| 2117628 | 7/1975 | Fed. Rep. of Germany . |
| 259182 | 8/1988 | Fed. Rep. of Germany . |
| 3810499 | 10/1989 | Fed. Rep. of Germany . |
| 2174934 | 11/1986 | United Kingdom . |

Primary Examiner—Johnny D. Cherry
Assistant Examiner—Dean J. Kramer
Attorney, Agent, or Firm—Karen G. Horowitz; Robert R. Jackson

[57] ABSTRACT

An armature gripping machine for transferring an armature of an electric motor or similar machine from one location to another, to load or unload a processing station of a production line is provided. The collet and surrounding tube of the gripping machine can be changed quickly and automatically, to accommodate a differently sized armature shaft. A fluid-fed piston mechanism within the gripping machine translates the collet tube along a longitudinal axis, causing the collet to grip or release an armature shaft. The collet may be removed from the gripping machine and replaced with a differently sized collet to accommodate armature shaft of various diameters. Alternatively, the collet and surrounding tube may be removed and replaced as a single unit to accommodate larger variations in armature shaft diameters. The change-over process can be automated.

21 Claims, 3 Drawing Sheets

ARMATURE GRIPPING MACHINE

This is a continuation, of application Ser. No. 07/539,989, filed Jun. 18, 1990, entitled ARMATURE GRIPPING MACHINE now abandoned.

BACKGROUND OF THE INVENTION

This invention relates to a machine for transferring an armature of an electric motor or similar machine from one location to another, to load or unload a processing station of a production line. More particularly, this invention relates to apparatus for gripping an armature, which can be quickly and automatically changed to accommodate a differently sized armature.

In manufacturing electric motors, unwound armatures must be moved from a loading pallet and placed in an armature winding machine to be wound with wire. After winding, the armature must be removed from the winding machine and transferred to other processing equipment for further processing (e.g., for fusing operations). A gripping machine may be used to transfer the armature between the various processing stations, and to precisely position the armature during the manufacturing operations.

An important consideration in the design of modern armature production lines is to enable the processing equipment to process armatures of different sizes. The processing equipment should allow any changes required to be made quickly, and such changes should not require special skill to perform. In a gripping machine, such as the machine of the present invention, changing the collet should be a simple process. For large variations in armature shaft diameter, it may be necessary to change both the collet and the surrounding collet tube. The change-over processes should be adaptable to automation.

Thus, it would be desirable to provide a gripping machine in which the collet for gripping an armature shaft can be changed easily and quickly, without requiring that the collet tube associated with the gripping machine be changed.

It would also be desirable to provide a gripping machine in which the collet and the collet tube can be removed and replaced as a single assembly.

It would also be desirable to provide a gripping machine in which change-over of the collet and the collet tube is adaptable to automation.

SUMMARY OF THE INVENTION

The above and other objects of the invention are accomplished in accordance with the principles of this invention by providing a gripping machine with a removable collet and collet tube assembly. The collet may be quickly changed over to a collet which will accommodate a differently sized armature shaft. Alternatively, both the collet and the collet tube may be changed over together, as a single assembly.

The collet of the gripping machine of the present invention is longitudinally fixed to the housing of the gripping machine by a ball connection. The housing typically may include a piston mechanism, activated by a fluid-feed system, for longitudinally translating the collet tube, to cause the collet to grip and release an armature shaft. The ball connection between the collet and the housing may be released by operating a plunger mechanism, to permit disengaging the components for removal and replacement. The plunger contacts and slides a retaining cup, permitting the balls of the ball connection to be displaced radially. The collet may then be pulled from the front of the collet tube of the gripping machine.

The collet tube is attached to the gripping machine housing assembly by a screw mechanism which tightens on the rear end of the collet tube. The collet tube and collet may be removed as a single unit by releasing the screw mechanism, operating the plunger mechanism to release the ball connection of the collet, and pulling the collet tube forward. The forward end of the collet wedges on the collet tube, disengaging the collet together with the collet tube.

The change-over process thus can be performed in a simple manner, without using tools. The plunger mechanism and the screw mechanism (on the rearward end of the collet tube) can be connected to or replaced with power-actuated mechanisms. This makes the apparatus well suited for automated change-over operations.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DETAILED DESCRIPTION OF THE PREFERRED EMBODIMENTS

Figure 1:
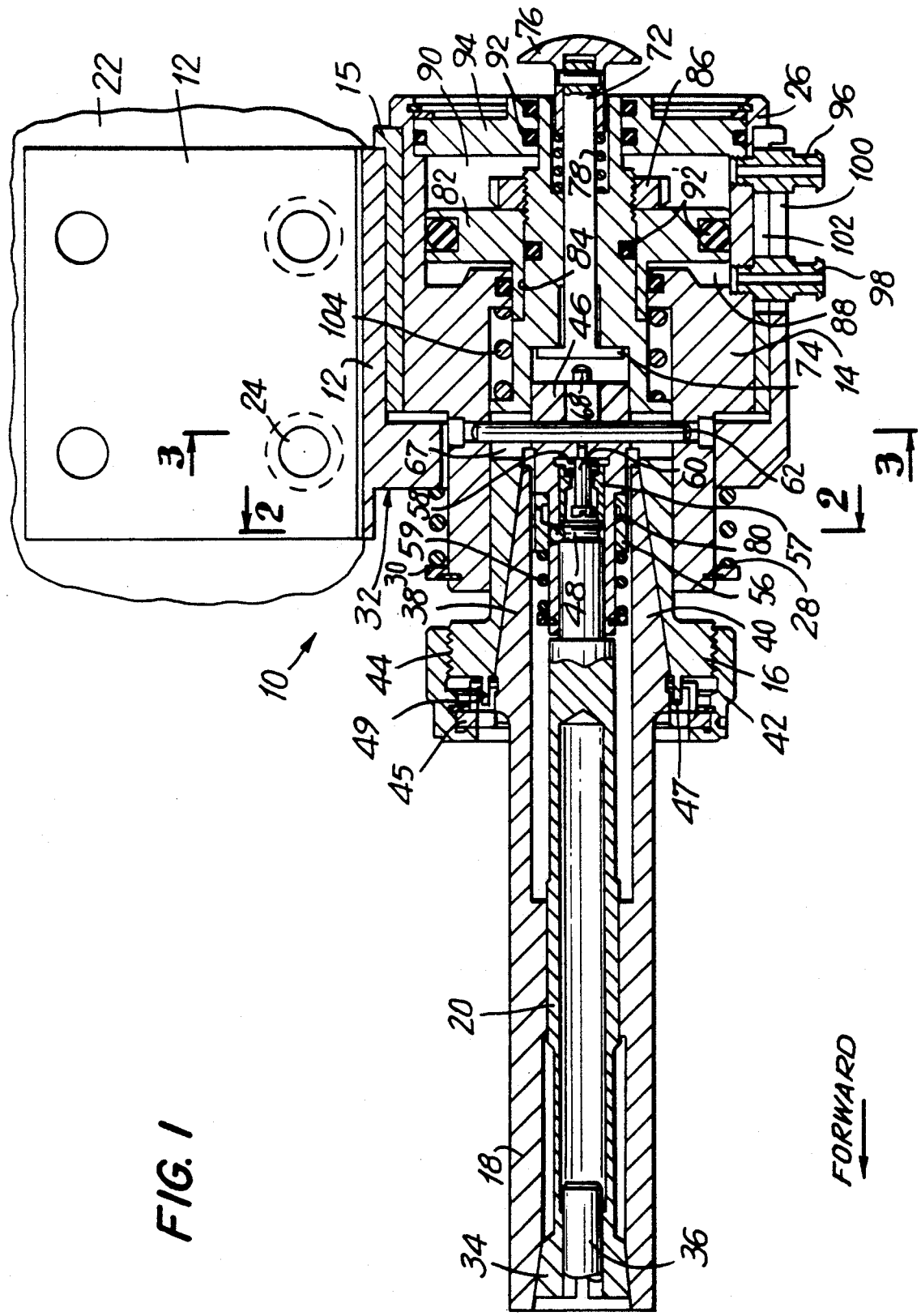
FIG. 1 is a longitudinal sectional view of a gripping machine in accordance with the principles of the present invention, showing the collet assembly fully inserted into the gripper housing.
Figure 4:
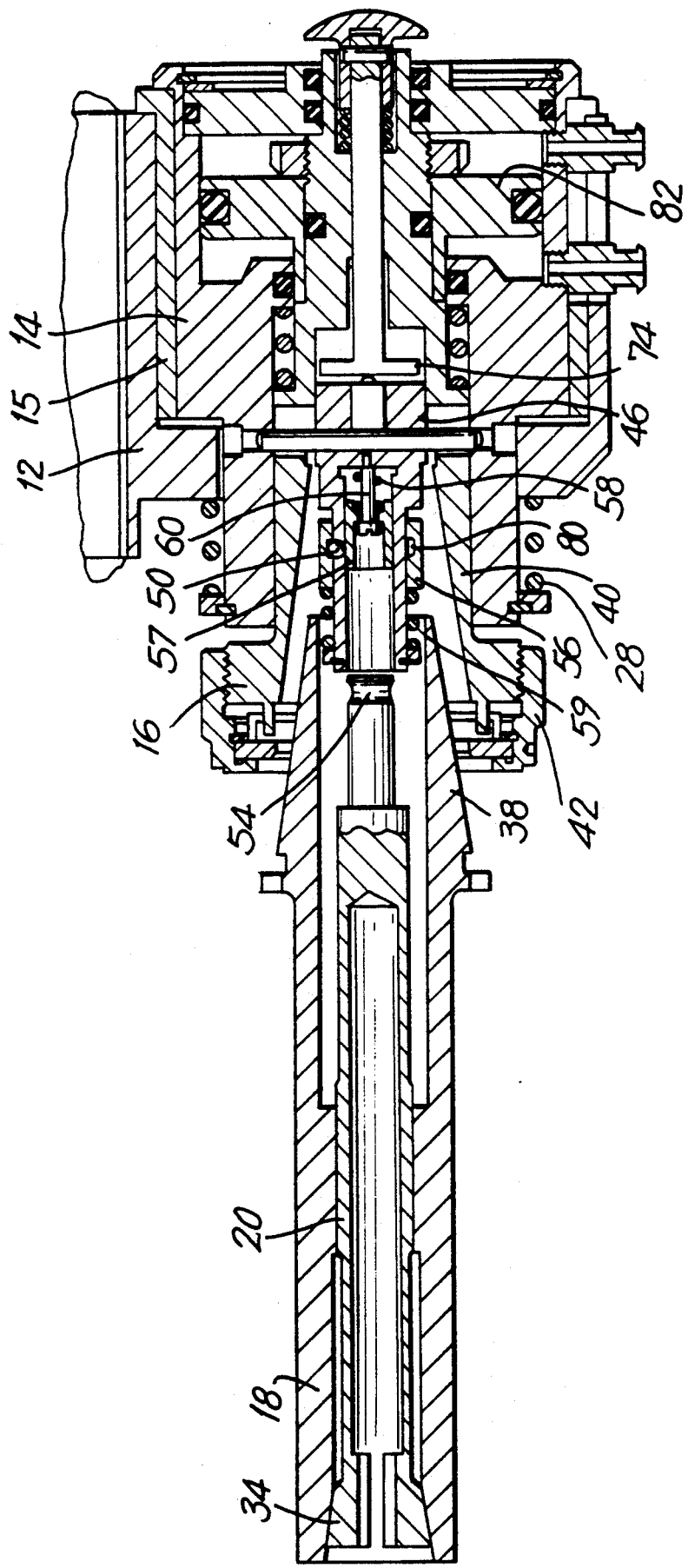
FIG. 4 is the same view as FIG. 1, showing the collet assembly partially inserted into the gripper housing.

Referring now to FIGS. 1 and 4, the gripping machine of the present invention, designated generally by reference number 10, includes a frame member 12, a housing member 14, a cylindrical bushing 15, an internal member 16, a removable collet tube 18, and a removable collet 20. Gripping machine 10 is rigidly fixed to a positioning unit 22 by bolts which pass through bores 24 in frame member 12. Positioning unit 22 typically may be a conventional mechanism which positions gripping machine 10 so that collet 20 can be aligned with other means (e.g., another collet) to deliver or receive an armature.

Cylindrical bushing 15 is rigidly supported in a cylindrical passage of frame member 12. Housing member 14 is slidably supported in cylindrical bushing 15. A ridge 26 of housing member 14 abuts against an end face of bushing 15 to position the housing member in the bushing. Ridge 26 is held against bushing 15 by a precompressed spring 28. One end of spring 28 acts on a ring 30 which is fixed to housing member 14, and the other end of spring 28 abuts a shoulder 32 of frame member 12. A cylindrical passage in housing member 14 supports slidably the outer surface of internal member 16.

Collet tube 18 has a rearward frustoconical end 38, which engages a conical bore 40 of internal member 16. Collet tube 18 is forced into bore 40 by a cup 42. Cup 42 engages thread 44 of internal member 16. Rotating cup 42 on thread 44 causes a washer 45 to push on a ridge of collet tube 18, creating a locking action in conical connection 38 and 40. To disconnect collet tube 18 from internal member 16, cup 42 is turned in the opposite direction, to pull on collet tube 18 via washer 45.

Internal member 16 typically may include one or more projections 47 and 49. Projections 47 and 49 engage corresponding slots in collet tube 18. The projections ensure proper angular positioning of the collet tube within internal member 16. The projections prevent collet tube 18 and washer 45 from rotating when cup 42 is turned on thread 44.

Collet tube 18 wedges on the forward frustoconical end 34 of split collet 20 to clamp an armature shaft 36. When positioning unit 22 causes gripping machine 10 to move forward to deliver and release an armature, the armature collector face is pushed against a reference surface of a second collet (e.g., the collet of a winding machine), which receives the armature and grips it. When the armature is stopped against the reference surface of the second collet, gripping machine 10, still firmly gripping the armature, moves towards the second collet to compress spring 28. Preloading spring 28 in such a manner produces a force on the armature sufficient to maintain the abutment of the armature collector face against the reference surface of the second collet. This ensures that the armature will be positioned properly when the second collet must operate to grip the armature which is still being held by collet 20.

Figure 2:
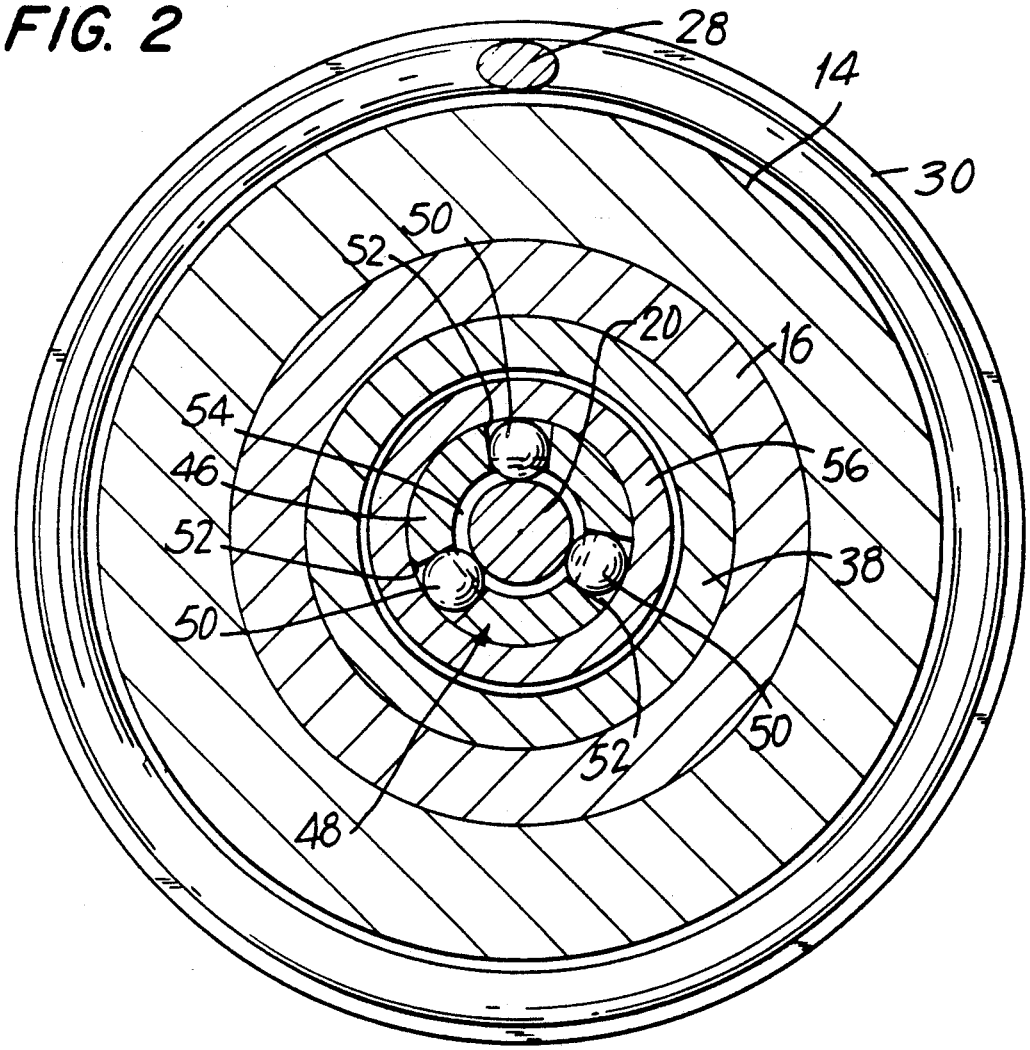
FIG. 2 is a cross-sectional view of the gripping machine of FIG. 1, taken along lines 2—2.

Collet 20 is releasably fixed to housing member 14 by an interior member 46. In a preferred embodiment of this invention, collet 20 is coupled to interior member 46 by a ball connection, designated generally by reference number 48. Ball connection 48 (also shown in FIG. 2) includes balls 50 which are seated in V-shaped, radial bores 52 in interior member 46. Balls 50 engage a circumferential groove 54 in the shaft of collet 20. An annular cup 56, biased by a spring 59, slides on the exterior surface of interior member 46 to cover bores 52, thereby preventing balls 50 from disengaging groove 54. A second annular cup 57, biased by spring 58, typically may be mounted in an inner passage of interior member 46, abutted by the shaft end of collet 20. When collet 20 is removed from the assembly, spring 58 causes cup 57 to capture balls 50 within a recess in cup 56. The head of a screw 60 limits the movement of cup 57 when collet 20 is not in the assembly.

Figure 3:
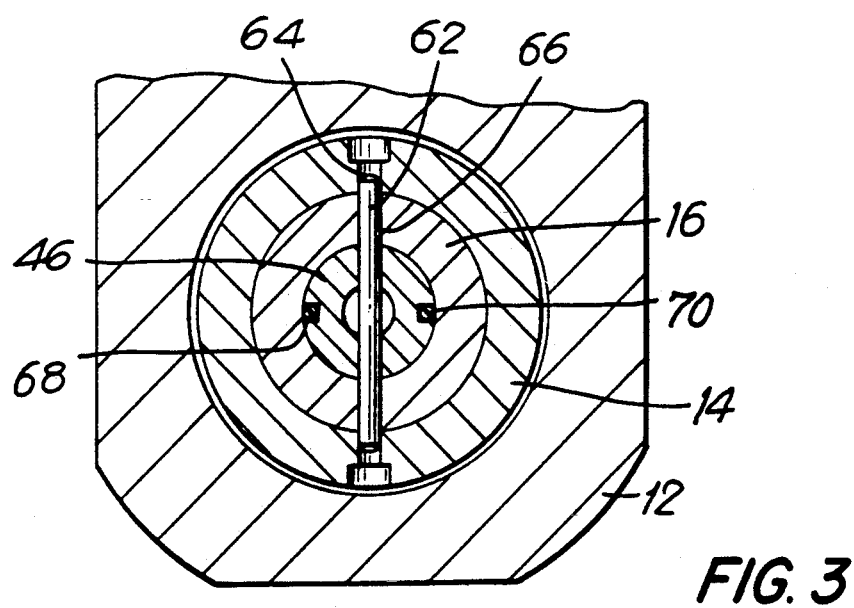
FIG. 3 is a cross-sectional view of the gripping machine of FIG. 1, taken along lines 3—3.

Interior member 46 is rigidly fixed to housing member 14 by a pin 62 (also shown in FIG. 3). Pin 62 passes through aligned, transverse bores 64 and 66 of housing member 14 and interior member 46, respectively. A slot 67 surrounding pin 62 permits internal member 16 to move relative to housing member 14. Interior member 46 has bores for slidably receiving pins 68 and 70 (FIG. 3). Pins 68 and 70 extend through member 46, and contact cup 56.

Gripping machine 10 includes a shaft 72 which slides in a passage of internal member 16. At one end of shaft 72 is a disk 74. A knob 76 is connected to the other end of shaft 72. A spring 78 pushes knob 76, such that disk 74 is normally maintained against a shoulder of internal member 16, out of contact with pins 68 and 70.

To disconnect collet 20, knob 76 is advanced against spring 78, causing disk 74 to abut pins 68 and 70. Further advancing of knob 76 causes pins 68 and 70 to move cup 56 until a recess 80 of cup 56 is aligned with balls 50. When the recess overlies balls 50, collet 20 can be disconnected from the gripping machine by pulling it from its forward end, so that balls 50 disengage groove 54 and displace into recess 80. As collet 20 is withdrawn from the assembly, cup 57 moves and captures the balls within recess 80. When the collet is removed, balls 50 preferably remain within recess 80, to facilitate mounting a replacement collet. Balls 50 preferably leave recess 80 only when a replacement collet has been inserted into collet tube 18.

A piston member 82 is fixed to the rearward, outer surface of internal member 16, and is fixed against a shoulder 84 by the pushing action of a threaded ring 86. Two annular chambers 88 and 90 are formed within gripping machine 10 by piston member 82 and air-tight seals 92. Chamber 90 is closed on the rearward end by means of air-tight member 94. The movement of piston member 82 causes internal member 16 to move, thereby causing collet 20 to grip or release an armature.

To cause collet 20 to grip armature shaft 36, a pressurized fluid (e.g., air) is fed to chamber 90 through fluid feed nozzle 96. The fluid pressure will bias piston member 82 in a forward direction, so that collet tube 18 wedges onto collet 20. During this operation, chamber 88 will be discharged. To release armature shaft 36, chamber 90 is discharged, and air or another fluid is supplied to chamber 88 through nozzle 98 to pressurize chamber 88. The pressure in chamber 88 causes piston member 82 to move until internal member 16 abuts member 94. Slots 100 and 102, in member 12 and bushing 15, respectively, allow nozzles 96 and 98 (which are connected to housing member 14) to move when housing member 14 moves relative to frame member 12.

Gripping machine 10 preferably includes a precompressed spring 104 to maintain collet tube 18 firmly wedged onto collet 20 should an accidental loss of fluid pressure in chamber 90 occur. One end of spring 104 abuts internal member 16. The other end of spring 104 pushes against housing member 14.

To disconnect collet tube 18 and collet 20 together, cup 42 is turned to release the forcing action of conical connection 40. Collet tube 18 can then be removed from internal member 16 by pulling it forward. At the same time, knob 76 is pushed against the action of spring 78 to release ball connection 48. As collet tube 18 moves forward to leave internal member 16, it pushes on forward frustoconical end 34 of split collet 20, causing collet 20 to move forward and dislodge balls 50 into recess 80 of cup 56.

One skilled in the art will appreciate that the present invention can be practiced by other than the described embodiments, which are presented for purposes of illustration and not of limitation, and the present invention is limited only by the claims which follow.

What is claimed is:

1. A gripping apparatus for holding a shaft of an armature comprising:
   a housing;
   a tube having a longitudinal axis, the tube at least partially disposed within the housing;
   a collet disposed within the tube and along the longitudinal axis for gripping the shaft of the armature;
   means for moving the tube along the longitudinal axis to selectively cause the collet to grip the shaft; and
   means for releasably coupling the collet to the housing positioned between the tube and the collet and confined by the interior walls of the portion of the tube disposed within the housing such that the coupling means is enclosed by the physical boundaries of the tube and the housing.

2. The apparatus of claim 1 further comprising a connection assembly, coupled to the housing, for releasably connecting the tube to the housing.

3. The apparatus of claim 2 wherein the connection assembly selectively prevents the tube from disengaging the housing and allows the collet to decouple from the housing.

4. The apparatus of claim 2 wherein the connection assembly comprises a screw mechanism which tightens on an end of the tube to couple the tube to the housing.

5. The apparatus of claim 4 wherein the screw mechanism further comprises a power actuator.

6. The apparatus of claim 2 wherein the connection assembly further comprises a power actuator.

7. The apparatus of claim 1, wherein the means for releasably coupling the collet includes means for releasably engaging a groove in the collet.

8. The apparatus of claim 1, wherein the means for releasably coupling is disposed within the housing.

9. The apparatus of claim 1, wherein the means for releasably coupling comprises a ball connection having at least one ball which engages a groove in the collet.

10. The apparatus of claim 9 further comprising means accessible from the exterior of the housing for releasing the ball connection.

11. The apparatus of claim 9 wherein the ball connection further comprises a retaining cup, and the apparatus further comprises a plunger mechanism which contacts and moves the retaining cup of the all connection to permit the at least one ball of the ball connection to be displaced radially outwardly, to release the ball connection.

12. The apparatus of claim 11 wherein the plunger mechanism is externally actuated.

13. The apparatus of claim 9 wherein the collet can be removed from an end of the tube, without decoupling the tube from the housing, when the ball connection is released.

14. The apparatus of claim 1 wherein the means for moving the tube along the longitudinal axis to selectively cause the collet to grip the shaft comprises a piston mechanism.

15. The apparatus of claim 14 wherein the piston mechanism is actuated by a fluid-feed system.

16. The apparatus of claim 1 wherein the tube extends past the means for releasably coupling the collet to the housing to contact the means for moving the tube.

17. A gripping apparatus for holding a shaft of an armature comprising:
a housing;
a tube having a longitudinal axis, the tube at least partially disposed within the housing;
a collet disposed within the tube and along the longitudinal axis for gripping the shaft of the armature;
means for releasably coupling the tube to the housing such that the tube and the collet may be removed from the housing concurrently as a unit, through loosening, without removing, the means for coupling the tube to the housing;
means for moving the tube along the longitudinal axis to selectively cause the collet to grip the shaft; and
means for releasably coupling the collet to the housing.

18. The apparatus of claim 17 wherein the means for releasably coupling the tube to the housing comprises a connection assembly, coupled to the housing, for releasably connecting the tube to the housing.

19. The apparatus of claim 18 wherein the tube further comprises an internal member and an external member, wherein the internal member is disposed within the housing and the external member is releasably coupled to the internal member with the coupling means such that the external member may be removed with the collet without removing the internal member from within the housing.

20. A gripping apparatus for holding a shaft of an armature comprising:
a housing;
a tube having a longitudinal axis;
a collet disposed within the tube and along the longitudinal axis for gripping the shaft of the armature;
means for moving the tube along the longitudinal axis to selectively cause the collet to grip the shaft;
means for releasably coupling the collet to the housing; and
means for accessing the coupling means, coupled to the housing and the coupling means, for selectively actuating the coupling means to release the collet from the housing;
wherein at least a portion of said accessing means remains within the housing to maintain coupling of the collet to the housing until actuated to release the collet from the housing.

21. The apparatus of claim 20 wherein the means for accessing the coupling means is accessible from the exterior of the housing.

* * * * *